(12) United States Patent
Kogiso et al.

(10) Patent No.: US 8,280,532 B2
(45) Date of Patent: Oct. 2, 2012

(54) REMOTE CONTROL SYSTEM

(75) Inventors: Kiminao Kogiso, Nara (JP); Kenji Sugimoto, Nara (JP); Kenji Hirata, Niigata (JP)

(73) Assignees: National University Corporation Nara Institute of Science and Technology (JP); National University Corporation Nagaoka University of Technology (JP)

( * ) Notice: Subject to any disclaimer, the term of this patent is extended or adjusted under 35 U.S.C. 154(b) by 160 days.

(21) Appl. No.: 12/446,208

(22) PCT Filed: May 30, 2007

(86) PCT No.: PCT/JP2007/061010
§ 371 (c)(1),
(2), (4) Date: Oct. 26, 2010

(87) PCT Pub. No.: WO2008/047493
PCT Pub. Date: Apr. 24, 2008

(65) Prior Publication Data
US 2011/0054638 A1 Mar. 3, 2011

(30) Foreign Application Priority Data
Oct. 18, 2006 (JP) ................................. 2006-283824

(51) Int. Cl.
*G05B 13/02* (2006.01)
*G05B 19/18* (2006.01)
*G05D 3/12* (2006.01)
(52) U.S. Cl. .................... 700/31; 700/3; 700/9; 700/12; 700/37; 700/287
(58) Field of Classification Search .................. 700/3, 9, 700/12, 28–32, 37, 53, 287
See application file for complete search history.

(56) References Cited

U.S. PATENT DOCUMENTS
5,726,879 A * 3/1998 Sato ............................... 700/56
(Continued)

FOREIGN PATENT DOCUMENTS
JP 02213902 A 8/1990
(Continued)

OTHER PUBLICATIONS

Supervision of Networked Dynamical Systems Under Coordination Constraints IEEE Transactions Automatic Control, vol. 51, No. 3, Mar. 2006, pp. 421-437 by Alessandro Casavola, Maurizio Papini, and Giuseppe Franze.

(Continued)

*Primary Examiner* — Sean Shechtman
(74) *Attorney, Agent, or Firm* — Studebaker & Brackett PC; Donald R. Studebaker

(57) ABSTRACT

Providing a remote control technique capable of realizing the achievement of constraints and the certain following of a target value even with a network in which delay, loss, distortion, or the like may occur. In a remote control system, an area setting unit of a client-side control unit sets at least two areas representative of a group of states of an target object, which changes over time by feedback control. A state-evaluation information sending unit sends, to the host-side control unit, state evaluation information obtained by evaluating the state of the target object based on the area set by the area setting unit. A target value setting unit of the host-side control unit sets a target value such that the state of the target object changes in the area set by the area setting units. Moreover, a target value updating unit updates the target value based on the state evaluation information received from the client-side control unit.

8 Claims, 9 Drawing Sheets

U.S. PATENT DOCUMENTS

| | | | |
|---|---|---|---|
| 6,542,782 B1 * | 4/2003 | Lu | 700/29 |
| 6,691,073 B1 * | 2/2004 | Erten et al. | 702/190 |
| 7,599,749 B2 * | 10/2009 | Sayyarrodsari et al. | 700/28 |

FOREIGN PATENT DOCUMENTS

| | | | |
|---|---|---|---|
| JP | 2000184469 A | 6/2000 | |

OTHER PUBLICATIONS

Y. Hamatani et al.; Model Based Control over Sensor Networks; 5th SICE Annual Conference Control Division; May 25-27, 2005; Sendai Civic Auditorium; Sendai, Japan; pp. 417-420.

Hideaki Ishii; H(infiniti) control with limited communication and message losses; ScienceDirect, Systems & Control Letters 57 (2008) pp. 322-331; Available online Oct. 25, 2007; Yokohama, Japan.

Elmer G. Gilbert; Linear Control Systems with Pointwise-in-Time Constraints: What Do We Do About Them?; 1992 FCC/FA1; p. 2565; Department of Aerospace Engineering, The University of Michigan Ann Arbor, MI.

* cited by examiner (a)

(b)

(a)

(b)

(a)

(b)

REMOTE CONTROL SYSTEM

TECHNICAL FIELD

The present invention relates to a remote control system for remotely controlling a target object in a distant location via a network.

Recently, with the development of network communication technology, we have seen many control systems utilizing network lines, and various study results on such control systems have been reported. It has also been known that when considering actual control systems, constraints on states or control inputs cannot be ignored.

DISCLOSURE OF INVENTION

For example, in the case where a target object in a distant location is remotely controlled via a network, when transmitting through a communication network that is inferior, transmission delay or loss of communication data, and an event (distortion) such as the change of the arrival order of the communication data might occur. We totally cannot predict at what timing the events such as transmission delay or loss or distortion would happen and how long the delay time takes. So far, when transmitting through a network in which the transmission delay or loss of the communication data or the change of the arrival order of the communication data occurs, a remote control technique, by which the target object certainly follows a target value while ensuring that the constraints of the control system are satisfied, had not yet been established.

Therefore, the present invention provides a remote control technique capable of realizing that the constraints are satisfied and the target value can be certainly followed up even with a network in which delay, loss, distortion, or the like may occur.

SUMMARY OF INVENTION

A remote control system according to the present invention is a remote control system for remotely controlling a target object in a distant location via a network, the remote control system including a host-side control unit to which operational information of the target object is input, and a client-side control unit which is connected to the host-side control unit via the network and feedback controls the state of the target object towards a target value received from the host-side control unit. The client-side control unit includes an area setting unit for setting at least two areas representative of a group of states of the target object each of which changes over time by the feedback control within a state space representative of the state of the target object, and a state-evaluation information sending unit for sending, to the host-side control unit, a state evaluation information which is obtained by evaluating the state of the target object based on the area set by the area setting unit. Further, the host-side control unit includes a target value setting unit for setting the target value such that the state of the target object changes within the area set by the area setting unit based on the input operational information of the target object, a target value updating unit for updating the target value based on the state evaluation information received from the client-side control unit, and a target value sending unit for sending the target value to the client-side control unit.

According to the remote control system, in the case where a target object in a distant location is remotely controlled via a network, when transmitting through an environment having inferior network communications, even when the transmission delay or loss of the communication data, or the event such as the change of the arrival order of the communication data occurs, the target object can certainly follow the target value while ensuring that the constraints of the control system are satisfied.

BRIEF DESCRIPTION OF DRAWINGS

FIG. 5(a) is a graph showing the transition of a target value and the relationship between time and rotation angle of load, and FIG. 5(b) is a graph showing the relationship between time and input voltage;

FIG. 6(a) is a graph showing the transition of the target value and the relationship between time and rotation angle of load, and FIG. 6(b) is a graph showing the relationship between time and input voltage;

FIG. 7(a) is a graph showing the transition of the target value and the relationship between time and rotation angle of load, and FIG. 7(b) is a graph showing the relationship between time and input voltage;

DETAILED DESCRIPTION OF THE INVENTION

Now, a remote control system according to an embodiment of the present invention will be described with reference to the accompanying drawings. Note that the remote control system of the present invention is not limited to the embodiment set forth below.

Figure 1:
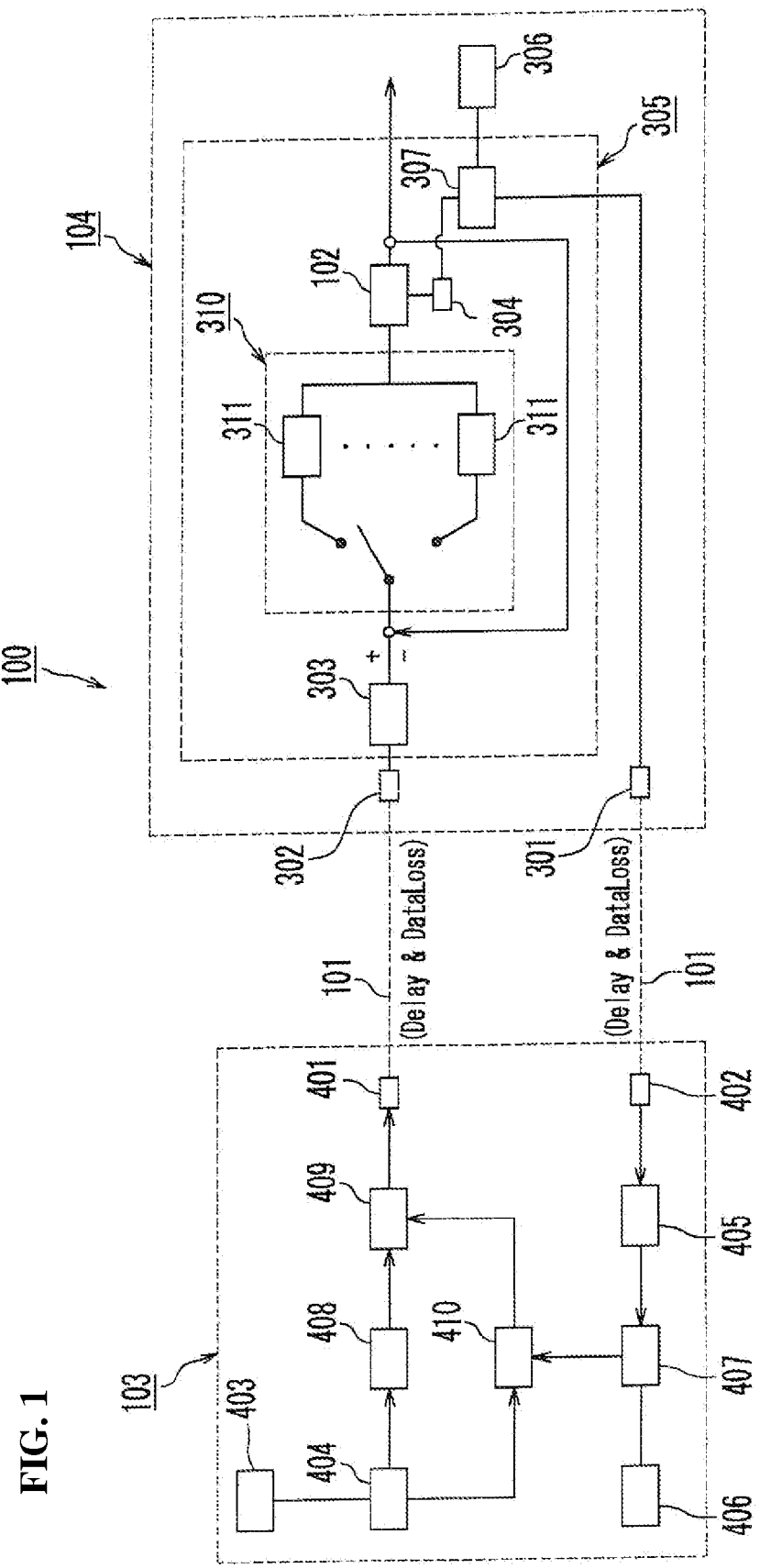
FIG. 1 is a diagram illustrating an example of configurations of a remote control system according to an embodiment of the present invention.

A remote control system 100 remotely controls a target object 102, which is at a distant location, via a network 101, and has a host-side control unit 103 and a client-side control unit 104, as shown in FIG. 1.

To the host-side control unit 103, operational information on the target object 102 is input. The client-side control unit 104 is connected to the host-side control unit 103 via the network 101, and feedback controls the state of the target object 102 towards a target value which is received from the host-side control unit 103.

In this embodiment, each of the host-side control unit 103 and the client-side control unit 104 is composed of a memory part such as a memory or hard disk and an operation part such as a CPU, and is embodied using a computer (electronic computer) which performs a predetermined function in accordance with a predetermined program. The client-side control unit 104 is placed at a location distant from the host-side control unit 103 to which operator commands are input.

In the embodiment, the "network 101" includes various types of communication networks available for remote operation or remote control, such as telephone line, the Internet, or wireless communication. Here, the communication network composed of low-quality network is subjected to the "network," and the situation where transmission delay or packet loss may occur is being considered.

Figure 2:
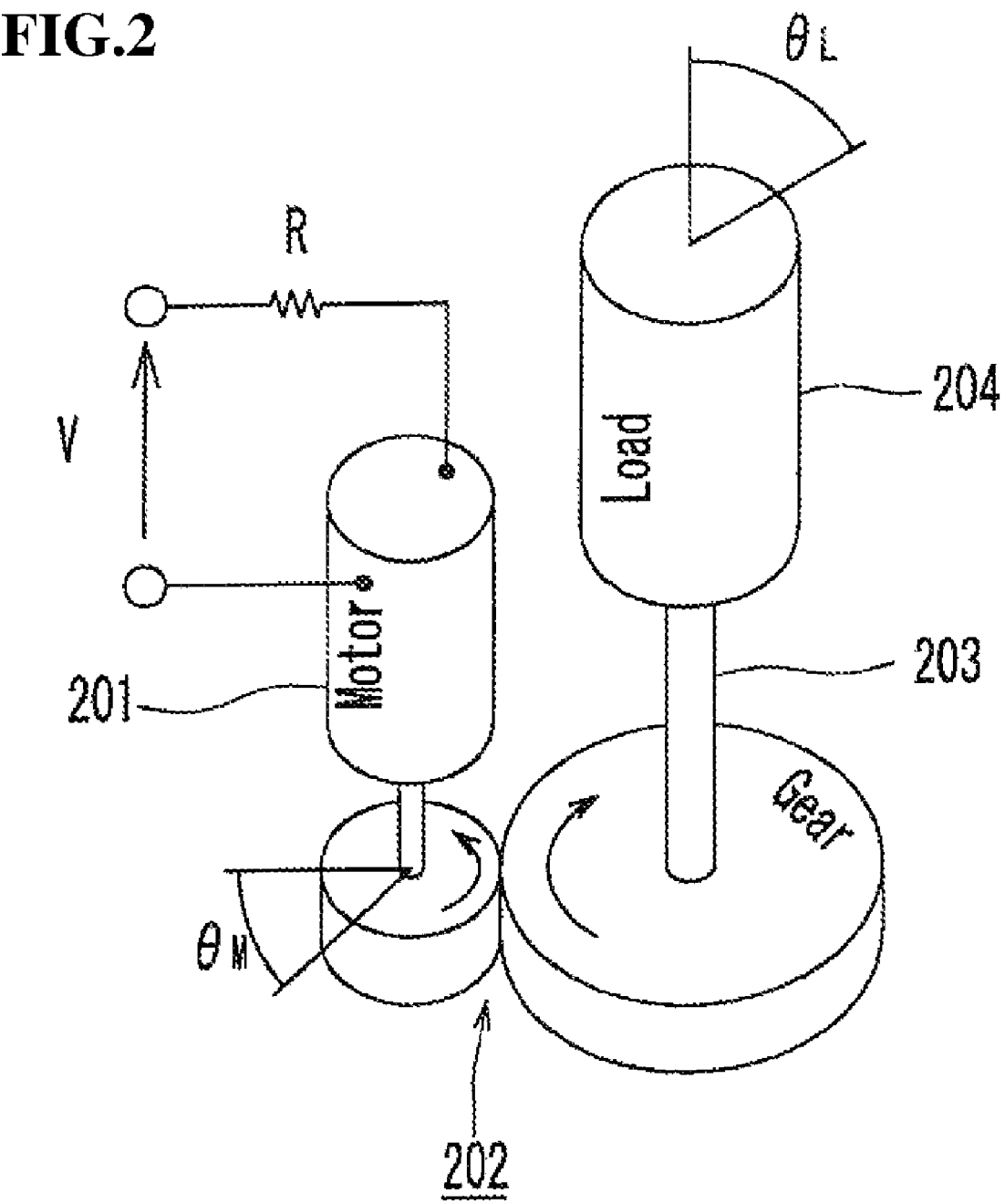
FIG. 2 is a perspective view illustrating a positional servomechanism as a target object according to the embodiment of the present invention.

In the remote control system, the target object 102 is preferably a linear system, of which target object is relatively easy to be controlled and linear, or a nonlinear system capable of linear approximation, and more preferably, a nonlinear system represented by polynomial representation. In other words, among nonlinear systems, the nonlinear system capable of linear approximation or some of nonlinear systems represented by polynomial representation can be used as the target object 102 of the remote control system. In the embodiment, a positional servomechanism composed of a DC motor 201, a gear 202, a shaft 203, and a load 204 is used as the target object, as shown in FIG. 2, and the voltage input to the DC motor 201 is used as manipulated variable.

Hereinafter, the client-side control unit 104 will be described.

As shown in FIG. 1, the client-side control unit 104 has: an area setting unit 306 for setting at least two areas representative of a group of states of the target object 102 each of which changes over time by feedback control within state space representative of the states of the target object 102; and a state-evaluation information sending unit 301 for sending, to the host-side control unit, the state evaluation information which is obtained by evaluating the states of the target object 102 based on the area set by the area setting unit 306.

Specifically, in the embodiment, the client-side control unit 104 has a sending unit 301 (state-evaluation information sending unit), a receiving unit 302, a target value memory unit 303, an observation unit 304, a feedback control unit 305, an area setting unit 306, and a state evaluating unit 307.

The sending unit 301 is a unit for sending the information to the host-side control unit 103, and the receiving unit 302 is a unit for receiving the information from the host-side control unit 103. In the embodiment, when sending the information to the host-side control unit 103, the sending unit 301 sends the data on the sending time in association with the sending information. When receiving the information from the host-side control unit 103, the receiving unit 302 adds the data on the receiving time in association with the received information.

The target value memory unit 303 stores the target value received from the host-side control unit 103 in the receiving unit 302.

In the embodiment, the communication from the host-side control unit 103 to the client-side control unit 104 in the network 101 may be subject to delay, loss, or distortion. As set forth below, when sending the information to the client-side control unit 104, the sending unit 401 of the host-side control unit 103 sends the information on the sending time along with the sending information. The target value memory unit 303 associates the target value received by the client-side control unit 104 with the sending time at which the host-side control unit 103 sends the target value, and the receiving time at which the client-side control unit 104 receives the target value, and stores them.

Moreover, the client-side control unit 104 can detect the delay and distortion of the data based on the sending time at which the host-side control unit 103 sends the target value and the receiving time at which the client-side control unit 104 receives the target value. For example, the delay of data can be detected when the difference between the sending time and the receiving time is more than a predetermined amount. The distortion of data can be detected, for example, when the order of the sending time (the sequential order of the sending time) is changed in the chronological arrangement of the data based on the receiving time. In the embodiment, the client-side control unit 104 does not detect the loss of data. However, the event that the data sent by the host-side control unit 103 are not received occurs.

In the embodiment, when the network 101 is subject to the delay of data, the client-side control unit 104 waits for the arrival of the data on the target value from the host-side control unit 103. Moreover, when the network 101 is subject to the distortion of data, the target value of which the sending time is earlier arrives later than the target value sent later. In this case, the target value memory unit 303 regards the target value which is arrived later as being lost. When the network 101 is subject to the loss of data, the target value memory unit 303 does not change the target value.

In any case, the target value memory unit 303 stores the target value in association with the sending time sent by the host-side control unit 103. In addition, the target value memory unit 303 stores the target value sent by the host-side control unit 103 at the latest time among the target values received by the client-side control unit 104, as the latest target value of the target object 102.

Next, the observation unit 304 observes the states of the target object 102, and the feedback control unit 305 feedback controls the target object 102.

In the embodiment, the observation unit 304 observes the angular velocity of the DC motor 201 and the rotation angle of the load 204 as the state of the target object 102, as shown in FIG. 2. The feedback control unit 305 adjusts, for the states of the target object 102, the manipulated variable based on the deviation between the observation value observed by the observation unit 304 and the target value, and controls the states of the target object 102 to get closer to the target value. The target value is set by the host-side control unit 103, and the target value received from the host-side control unit 103 is set. In the embodiment, as described above, the target value memory unit 303 stores the target value sent by the host-side control unit 103 at the latest time among the target values received by the client-side control unit 104, as the latest target value of the target object 102. Thus, among the target values received by the client-side control unit 104, the target value of which the sending time at which the host-side control unit 103 sends is the latest is set to the target value of the feedback control.

The area setting unit 306 sets at least two areas representative of a group of states of the target object 102 each of which changes over time by feedback control within state space representative of the states of the target object 102.

Herein, the area "representative of a group of states of the target object 102 each of which changes over time by feedback control within state space representative of the states of the target object 102" refers to an area where the feedback control ensures the states of the target object 102 to continue to be located within the area even though the time passes.

In the embodiment, each area set by the area setting unit 306 is set in accordance with the gain. Moreover, the client-side control unit 104 has a switching unit 310 (switching control unit) for switching the gain of the feedback control depending on the areas where the states of the target object 102 are located, as shown in FIG. 1.

More specifically, in the embodiment, the area is defined by the maximum output allowable set of the state feedback system which is determined by the initial state, the target value, and the gain of the target object 102.

Herein, the "output allowable sets" refer to a group composed of the whole of states such as the movement to the equilibrium point (or the origin) without violating the constraints (with the states continuing to be located within the output allowable sets) when in the area (state sets) defined in the state space, the state of the control system is included therein and the target value of the state feedback does not change. The largest set among the output allowable sets is referred to as the maximum output allowable set. When the state of the target object at a certain time is located within the maximum output allowable set with respect to the target value, such maximum output allowable set ensures that the state of the target object indefinitely continues to be located within the maximum output allowable set as long as the target value of the state feedback does not change.

The gain to set the maximum output allowable set is designed in advance in consideration of the conditions which are imposed to stably operate the target object.

Figure 3:
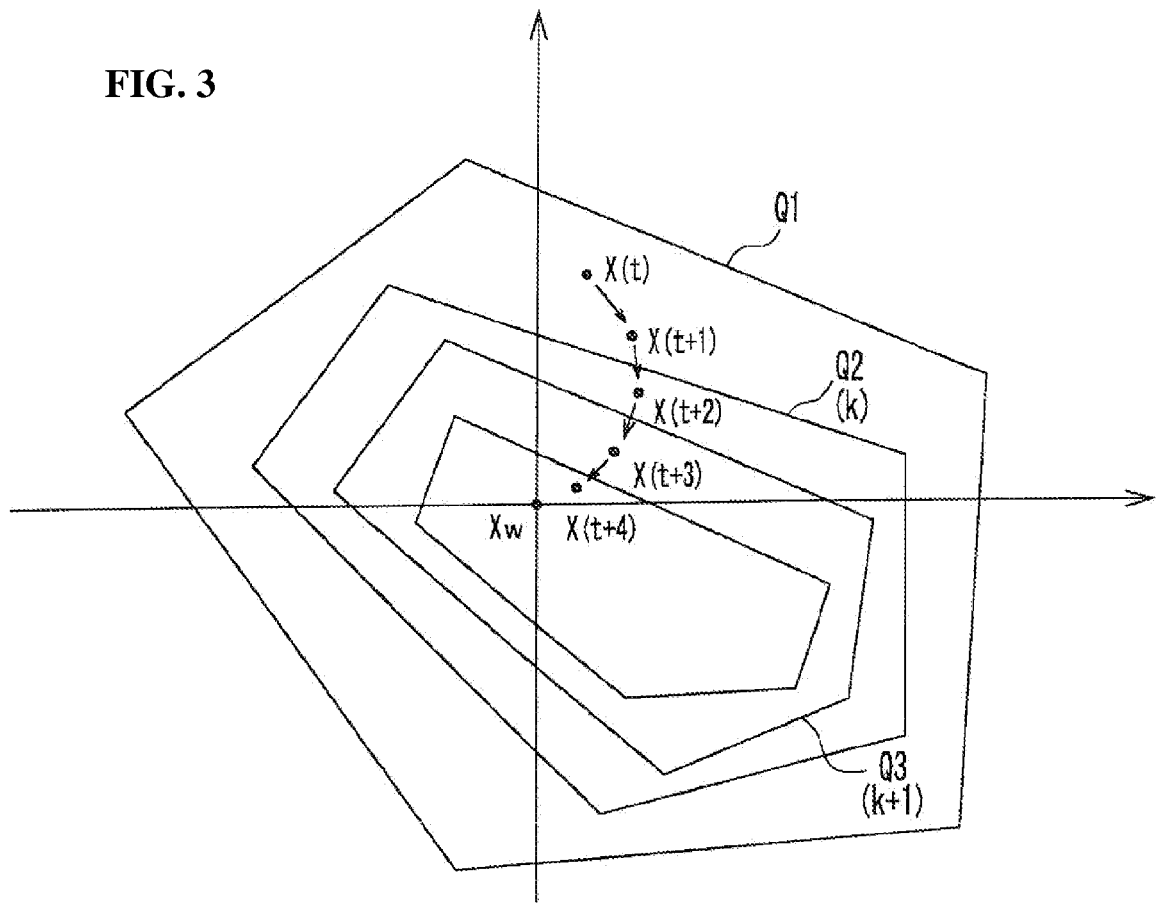
FIG. 3 is a diagram schematically illustrating an area set by an area setting unit of the remote control system according to the embodiment of the present invention.

Each of the maximum output allowable sets Q1, Q2, Q3 . . . of the different gains constitutes the area where a state Xw of the target object 102 at a target value w serves as the origin in the state space representation, as shown in FIG. 3. The larger the gain is, the smaller the shapes of the maximum output allowable sets Q1, Q2, Q3 . . . are. When being arranged in descending order, the maximum output allowable sets Q1, Q2, Q3 . . . of the larger (k+1)th gain are present within the maximum output allowable set of the smaller kth gain. In the state space, the shapes of the maximum output allowable sets Q1, Q2, Q3 . . . do not change even when the target value changes. Specifically, in the state space, the maximum output allowable sets Q1, Q2, Q3 . . . translates in accordance with an amount of change $\Delta X$ of the state Xw of the target object 102 at the target value when the target value w is changed. As for the feedback control, when the feedback control proceeds, a state X(t) of the target object 102 gradually gets closer to the state Xw of the target object 102 at the target value w like X(t+1), X(t+2), X(t+3), and X(t+4), and gradually moves to the inner areas. Herein, it is noted that X(t) refers to the state of the target object 102 at t time.

The state evaluating unit 307 evaluates the state of the target object 102 based on the area set by the area setting unit 306. In the embodiment, the state evaluating unit 307 evaluates the state X(t) of the target object 102 depending on which area (the maximum output allowable set of each gain) in the areas (the maximum output allowable set of each gain) set by the area setting unit 306 the state X(t) of the target object 102 is located in. In this case, since the areas (the maximum output allowable set of each gain) are superimposed, the smallest area (the maximum output allowable set) among the areas (the maximum output allowable set of each gain) where the state X(t) of the target object 102 is located is determined, and evaluates the state of the target object 102.

For example, assume that a plurality of areas is numbered in the descending order such as 1, 2, 3 . . . . When the state of the target object 102 moves from the 1st area into the 2nd area by the feedback control, the smaller 2nd area of the areas where the state of the target object 102 is located is regarded as the area where the state of the target object 102 is located.

In the embodiment, the feedback control unit 305 feedbacks the state of the target object 102, and adjusts the control amount based on the deviation from the target value. In this case, the feedback control unit 305 feedbacks the information on which area the state of the target object 102 is located in, along with the state of the target object 102.

In the embodiment, the switching unit 310 has a plurality of control units 311 every gain, as shown in FIG. 1, and changes the gain of the feedback control by switching the control unit 311 in accordance with which area the target object 102 is located in. With the configuration, the client-side control unit 104 controls the target object 102 with the optimum gain which is designed in advance depending on the state of the target object 102.

The feedback control of the client-side control unit 104 described above ensures that the state of the target object 102 is indefinitely located within the maximum output allowable set of the gain with respect to the target value and that the state of the target object 102 will reach the target value eventually by the feedback control.

The sending unit 301 of the client-side control unit 104 sends the information from the client-side control unit 104 to the host-side control unit 103. In the embodiment, the sending unit 301 also acts as a state-evaluation information sending unit so as to send, to the host-side control unit 103, the state evaluation information obtained by evaluating the state of the target object 102 based on the area set by the area setting unit 306. In the embodiment, the state evaluation information is the information on the smallest area where the state of the target object 102 is located, and the number of such area is sent as the state evaluation information. In this case, the data on the sending time at the client-side control unit 104 is sent to the host-side control unit 103 along with the state evaluation information. Moreover, in this embodiment, the client-side control unit 104 sends the state evaluation information to the host-side control unit 103 at predetermined intervals and periodically.

It is noted that the client-side control unit 104 does not send the state of the target object 102 to the host-side control unit 103. Specifically, the information on the state of the target object 102, which is observed by the observation unit 304 of the client-side control unit 104, is not sent to the host-side control unit 103. The information on the state of the target object 102, which is observed by the observation unit 304, may have too large amount of information to be transmitted in the low-quality network. On the other hand, the state evaluation information obtained by evaluating the state of the target object 102 in the aforementioned area (the maximum output allowable set of each gain) has smaller amount of information than the state of the target object 102 which is observed by the observation unit 304.

As described above, in the embodiment, the state evaluation information obtained by evaluating the state of the target object 102 in the aforementioned area (the maximum output allowable set of each gain) is sent from the client-side control unit 104 to the host-side control unit 103.

With this configuration, when the information on the state of the target object 102 is sent, the amount of information sent from the client-side control unit 104 to the host-side control unit 103 can be minimized. Moreover, the state of the target object 102 changes over time by the feedback control of the client-side control unit 104 whereas the aforementioned state evaluation information ensures that the state of the target object 102 is indefinitely located in the area specified by the state evaluation information as long as the target value of the feedback control does not change.

Next, the host-side control unit 103 will be described.

As shown in FIG. 1, the host-side control unit 103 has: a target value setting unit 408 for setting a target value such that the states of the target object 102 change within the area set by the area setting unit 306 based on the input operational information of the target object 102; a target value updating unit 410 for updating the target value based on the state evaluation information received from the client-side control unit 104; and a sending unit 401 (a target value sending unit) for sending the target value to the client-side control unit 104.

Specifically, in the embodiment, the host-side control unit 103 has the sending unit (target value sending unit) 401, a receiving unit 402, an input unit 403, an operational information memory unit 404, a state evaluation memory unit 405, an area setting unit 406, a state determining unit 407, a target value setting unit 408, a target value memory unit 409, and a target value updating unit 410.

The sending unit 401 sends the information to the client-side control unit 104 and the receiving unit 402 receives the information from the client-side control unit 104. In the embodiment, when sending the information to the client-side control unit 104, the sending unit 401 sends the data on the sending time in association with the sending information. When receiving the information from the client-side control unit 104, the receiving unit 402 adds the data on the receiving time in association with the received information.

To the input unit 403, the operational information of the target object 102 is input. The operational information memory unit 404 stores the operational information input to the input unit 403.

The state evaluation memory unit 405 stores the state evaluation information received from the client-side control unit 104. The state evaluation information is stored together with the data on the sending time at the client-side control unit 104 and the data on the receiving time at the host-side control unit 103. Moreover, the state evaluation memory unit 405 can detect the delay, loss, and distortion of data based on the time at which the state evaluation information is sent from the client-side control unit 104 and the time at which the state evaluation information is received at the host-side control unit 103.

In the embodiment, when the network 101 is subject to the delay of data, the host-side control unit 103 waits for the arrival of the data on the state evaluation information from the client-side control unit 104. When the network 101 is subject to the loss of data, the state evaluation memory unit 405 does not change the state evaluation information. Moreover, in the case where the network 101 is subject to the distortion of data, when the earlier sent data arrives later than the data sent later, the state evaluation memory unit 405 regards the data which is arrived later as being lost, and thus the state evaluation memory unit 405 does not change the state evaluation information.

In any case, the state evaluation memory unit 405 stores the state evaluation information in association with the sending time sent by the client-side control unit 104. In addition, the state evaluation memory unit 405 stores the state evaluation information sent by the client-side control unit 104 at the latest time among the state evaluation information received by the host-side control unit 103, as the latest state evaluation information of the target object 102.

The area setting unit 406 of the host-side control unit 103 sets the same area as by the area setting unit 306 of the client-side control unit 104. Specifically, in the embodiment, the area setting unit 406 of the host-side control unit 103 sets the areas corresponding to the maximum output allowable sets of the same plurality of gains set by the client-side control unit 104.

The target value setting unit 408 sets a provisional target value such that the state of the target object 102 changes within the area set by the area setting unit 406 based on the operational information of the target object 102 which is input to the input unit 403.

The provisional target value is provisionally set in consideration of the conditions or the like which are imposed to stably operate the target object 102. Therefore, the provisional target value is set for the final target value which is input as the operational information of the target object 102.

In the embodiment, the gain is set in consideration of the conditions or the like which are imposed to stably operate the target object 102. In the case of the provisionally set target value $w_0$, the maximum output allowable sets of the aforementioned gains are defined with a state $Xw_0$ of the target object 102 at the provisional target value $w_0$ being the origin. Moreover, the provisional target value $w_0$ is set to include the initial state $X_0$ of the target object 102 in the maximum output allowable set of the smallest gain among the aforementioned gains of the area setting unit 406.

Figure 8:
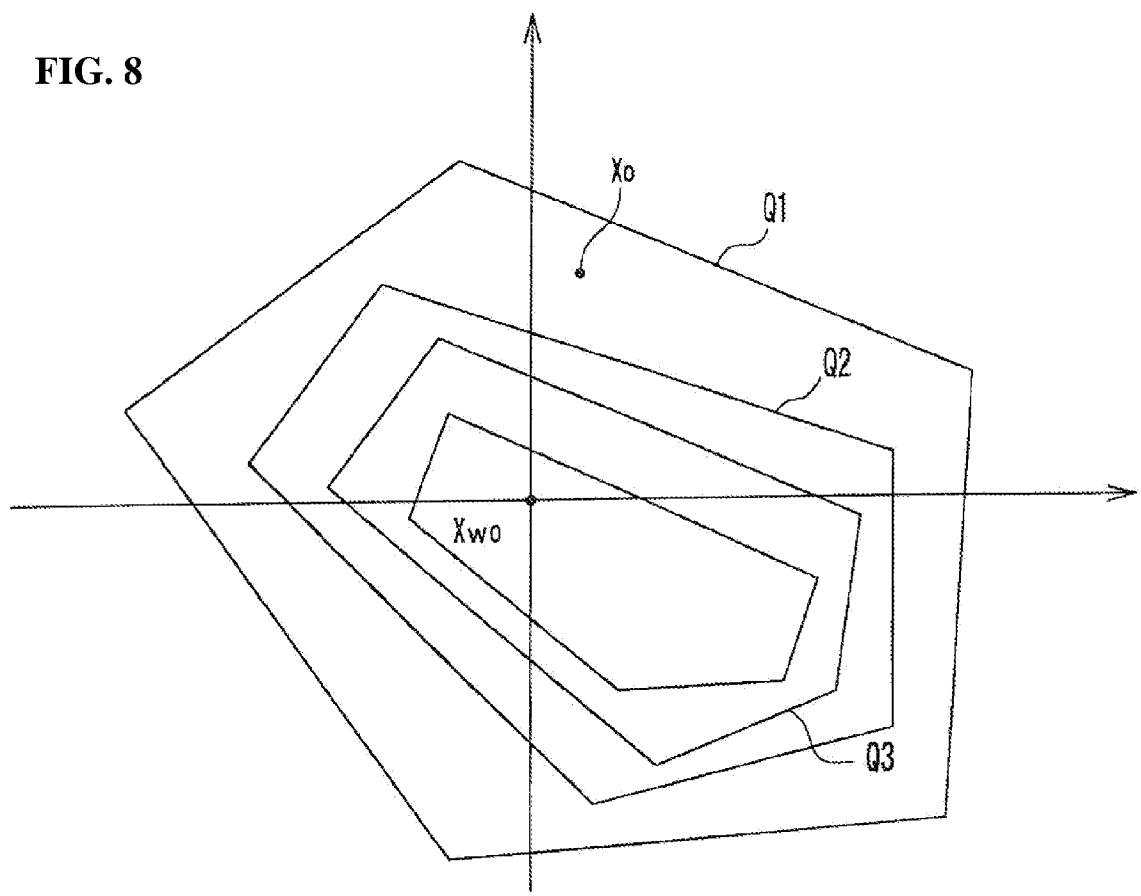
FIG. 8 is a diagram schematically illustrating a setting of a provisional target value in the remote control system according to the embodiment of the present invention.

In other words, as shown in FIGS. 1 and 8, the provisional target value $w_0$ is a target value which is provisionally set to include the initial state $X_0$ of the target object 102 in the maximum output allowable set Q1 of at least the smallest gain of the gains of the area setting unit 406.

Since the initial state $X_0$ of the target object 102 is included in the maximum output allowable set Q1 of the smallest gain by setting the provisional target value $w_0$ in such a manner, it is possible to ensure that the target object 102 is stably operated. In addition, as shown in FIG. 1, the state of the target object 102 can be constrained within the maximum output allowable set A of the smallest gain of the gains of the aforementioned area setting unit 406 by the feedback control of the client-side control unit 104.

In the embodiment, the state of the target object 102 is observed at the client-side control unit 104, but the host-side control unit 103, which is connected thereto via the network 101, does not grasp the state of the target object 102 because of no information. Therefore, it is a problem how the host-side control unit 103 grasps the initial state $X_0$ of the target object 102. In the embodiment, the feedback control of the client-side control unit 104 ensures that the state of the target object 102 eventually reaches the target value. Therefore, the target value in the last control of the target object 102 serves as the initial state $X_0$ of the target object 102. When the initial state $X_0$ of the target object 102 is grasped by the host-side control unit 103, the target value and the area may be set using the grasped initial state $X_0$. For example, when the target object 102 always has a predetermined state in the initial state, such predetermined location may be stored in the host-side control unit 103 and used as the initial state.

The target value set by the target value setting unit 408 is stored in the target value memory unit 409 and is sent from the sending unit 401 (the target value sending unit) to the client-side control unit 104. At this time, the sending unit 401 sends the data on the target value to the client-side control unit 104 along with the data on the sending time at the host-side control unit 103.

As described above, upon receipt of the target value from the host-side control unit 103, the client-side control unit 104 feedback controls the state of the target object 102 to get closer to the target value in accordance with the received target value. The state evaluation information, which is obtained by evaluating the state of the target object 102 based on the area set by the area setting unit 406, is sent from the client-side control unit 104 to the host-side control unit 103. The state evaluation information received at the host-side control unit 103 is stored in the state evaluation memory unit.

The target value updating unit 410 updates the target value based on the state evaluation information received from the client-side control unit 104. In the embodiment, the target value updating unit 410 updates the target value when the state evaluation stored in the state evaluation memory unit 405 satisfies the predetermined condition based on the determining condition which is set in advance by the state determining unit 407.

In the embodiment, the state determining unit 407 determines whether the state of the target object 102 is located in a certain area of the areas set by the area setting unit 406. For example, assume that the area setting unit 406 sets k areas. The state determining unit 407 sets m to satisfy the formula $1 \leqq m \leqq (k-1)$ and determines whether the state of the target object is located inside or outside of the mth area.

In principle, the target value updating unit 410 does not update the target value when the state determining unit 407 determines that the state of the target object is located outside (OUT) of the certain area, and updates the target value when it determines that the state of the target object is located inside (IN) of the certain area.

Exceptionally, even when the state determining unit 407 determines the inside (IN) of the certain area, the target value updating unit 410 does not update the target value as long as the provisional set target value is the same as the final target value.

In some cases, at the beginning of the communication, when the state determining unit 407 determines, the state evaluation information may not yet have been received due to the delay or loss in the communication from the client-side control unit 104 to the host-side control unit 103. In such cases, it may be provided that the state determining unit 407 determines OUT so as not to update the target value.

In the embodiment, the target value updating unit 410 determines the amount of change of the target value such that the state of the target object 102, which is located in the certain area, is maintained within the area located outermost at the updated target value to set a new target value.

The target value updated by the target value updating unit 410 is stored in the target value memory unit 409 and is sent from the sending unit 401 (the target value sending unit) to the client-side control unit 104.

The client-side control unit 104 feedback controls the state of the target object 102 for the target value received from the host-side control unit 103.

Figure 4:
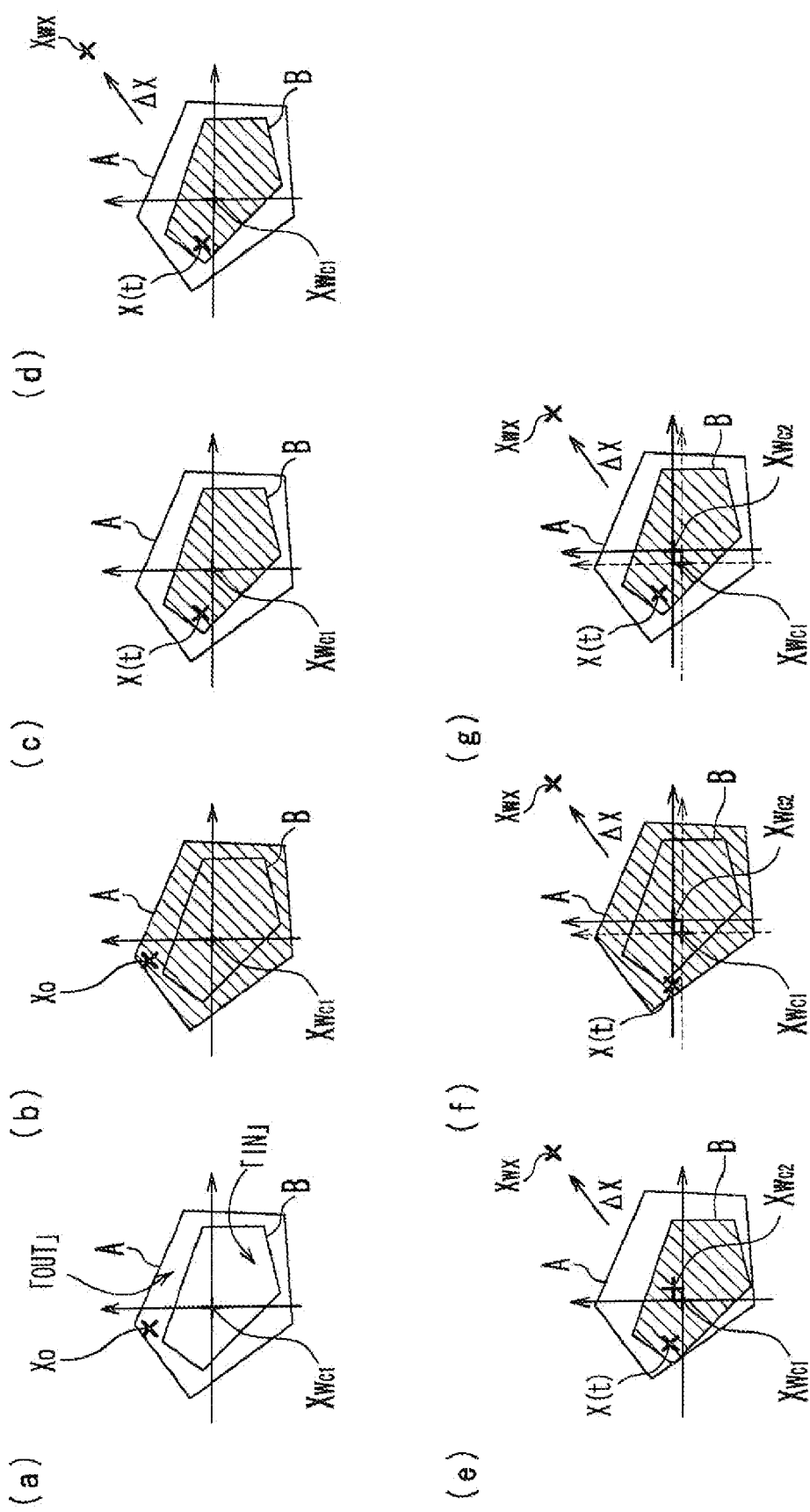
FIG. 4 is a diagram illustrating the control by a host-side control unit of the remote control system according to the embodiment of the present invention.

FIG. 4 schematically illustrates the feedback control recognized at the host-side control unit 103 (see FIG. 1).

An inner area B in FIGS. 4(a) through (g) denotes the "certain area." An area A in FIGS. 4(a) through (g) denotes the maximum output allowable set of the smallest gain among the gains of the area setting unit 406 (see FIG. 1). The state determining unit 407 (see FIG. 1) determines "OUT" when the state of the target object 102 is located outside of the area B and inside of the area A, and determines "IN" when the state of the target object 102 is located inside of the area B, as shown in FIG. 4(a).

As shown in FIG. 4(a), at first, the host-side control unit 103 provisionally sets a target value $w_{c1}$. Moreover, in the state space representation, an area is set with $Xw_{c1}$, which indicates the state of the target object 102 at the provisional target value $w_{c1}$, being used as the origin. At this time, the provisional target value $w_{c1}$ is set such that the initial state $X_0$ of the target object 102 is included in the maximum output allowable set A of the smallest gain among the gains of the area setting unit 406.

As shown in FIGS. 4(a) and (b), when the initial state $X_0$ of the target object 102 is located outside of the area B and inside of the area A, the host-side control unit 103 determines the state of the target object 102 as "OUT" based on the determination of the state determining unit 407.

Then, as the feedback control proceeds, the state $X(t)$ of the target object 102 gets closer to the target value $Xw_{c1}$ which is located at the origin. When the state of the target object 102 enters the area B, the host-side control unit determines the state $X(t)$ of the target object 102 as "IN" based on the determination of the state determining unit 407, as shown in FIG. 4(c).

When the state determining unit 407 determines "IN," the target value updating unit 410 updates the provisional target value $Xw_{c1}$ for the state $Xw_x$ of the target object 102 at the final target value $w_x$. In the embodiment, the amount of change with which the provisional target value $Xw_{c1}$ is updated is determined such that the state of the target object 102 which is located in the area B is maintained inside of the outermost area A even after the target value is updated. Specifically, in FIGS. 4(d) and 4(e), $Xw_{c1}$ denotes the state of the target object 102 at the pre-updated target value, and $Xw_{c2}$ denotes the state of the target object 102 at the updated target value. The target value updating unit 410 determines an amount of change $\Delta X$ with which the target value $Xw_{c1}$ is updated such that the state of the target object 102 which was located in the area B before the target value $Xw_{c1}$ is updated is maintained inside of the outermost area A even after the target value $Xw_{c1}$ is updated. Then, as shown in FIG. 4(e), the target value $Xw_{c1}$ is moved only by $\Delta X$ to set a new target value $Xw_{c2}$. Here, the amount of change $\Delta X$ with which the provisional target value $Xw_{c1}$ is updated has a relationship $\Delta X = XW_{c2} - XW_{c1}$.

In the case where the target value is updated in such a manner, even when the target value $Xw_{c1}$ is updated to $Xw_{c2}$ by the target value updating unit 410, the pre-updated area B is located inside of the updated area A. Therefore, it is ensured that the state of the target object 102 is located inside of at least area A. For this reason, after updating the target value, the host-side control unit 103 determines the state of the target object 102 as "OUT" based on the determination of the state determining unit 407, as shown in FIG. 4(f).

Then, as the feedback control further proceeds, the state $X(t)$ of the target object 102 gets closer to the target value which is located at the updated origin. When the state of the target object 102 enters the area B, the host-side control unit 103 determines the state of the target object 102 as "IN" based on the determination of the state determining unit 407, as shown in FIG. 4(g).

The state is similar to that in FIG. 4(c). The host-side control unit 103 then repeats the states illustrated in FIGS. 4(c) through 4(g) in accordance with the degree of the feedback control of the client-side control unit 104, so that the target value is updated. This ensures that the state of the target object 102 is always located within the outermost area. Moreover, the target value updated by the target value updating unit gradually gets closer to the final target value. Finally, the final state of the target object 102 reaches the final target value $Xw_x$ by the feedback control of the client-side control unit 104.

Next, an example, in which the remote control of the remote control system 100 is applied to the positional servo-mechanism composed of a DC motor 201, a gear 202, a shaft 203, and a load 204, as shown in FIG. 2, will be described. In this case, the controlled variable is a rotation angle $\theta_L$ of the load, and the manipulated variable is input voltage input to the DC motor 201. In FIG. 2, $\theta_M$ denotes the rotation angle of the motor 201.

Hereinafter, the operation of the remote control system 100 will be described in the case where the network 101 has no delay or loss, and the network 101 has any delay or loss. In all the examples, it is common that in the exemplified control operation, the rotation angle $\theta_L$ of the load 204 is firstly moved +40° and then is moved to −28°, and that as the constraints, the input voltage input to the DC motor has the maximum value of 2.4V.

First of all, the first example illustrates the case where the network 101 is not subject to delay or loss. In this case, the upper limit of the input voltage input to the DC motor 201 is 2.4V when the rotation angle is moved from 0° to +40°. Under the constraints, the provisional target value is determined FIG. 5(*a*) illustrates the relationship between time and rotation angle of the load 204 in the first example, and FIG. 5(*b*) illustrates the relationship between time and input voltage. The sequentially transition of the target value is denoted by the two-dot chain line in FIG. 5(*a*). When the rotation angle is moved from 0° to +40°, the first provisional target value is defined near 18° and the second provisional target value is defined near 30°. Thus, the input voltage input to the DC motor 201 does not exceed 2.4V as shown in FIG. 5(*b*) and the constraints are not violated.

Figure 5:
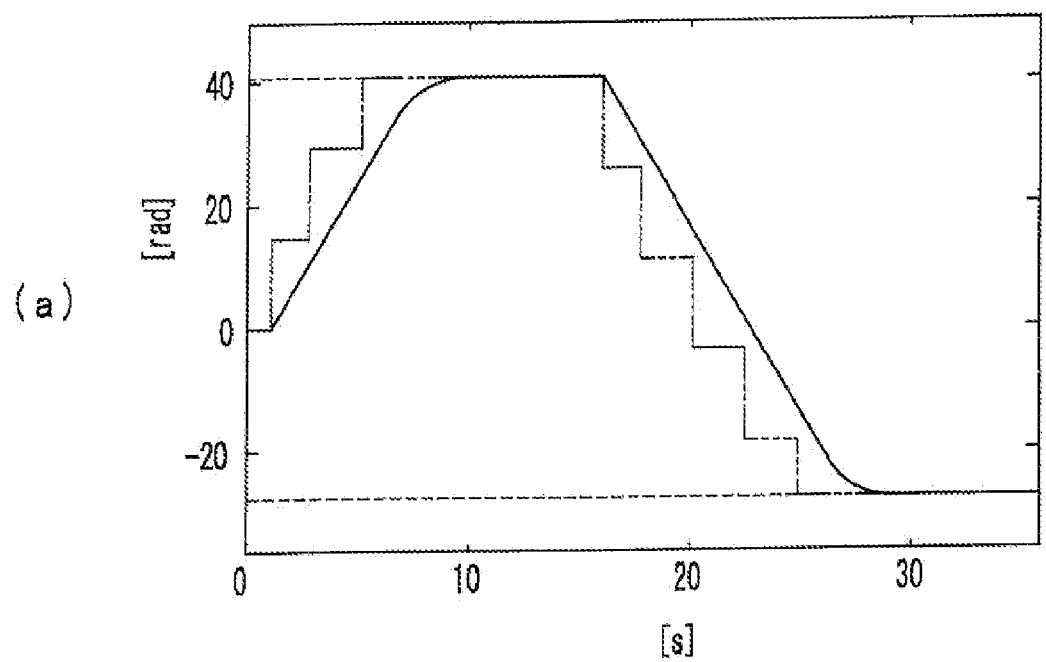
FIGS. 5(a) and 5(b) are graphs illustrating an example of the remote control system according to the embodiment of the present invention, and specifically
Figure 5:
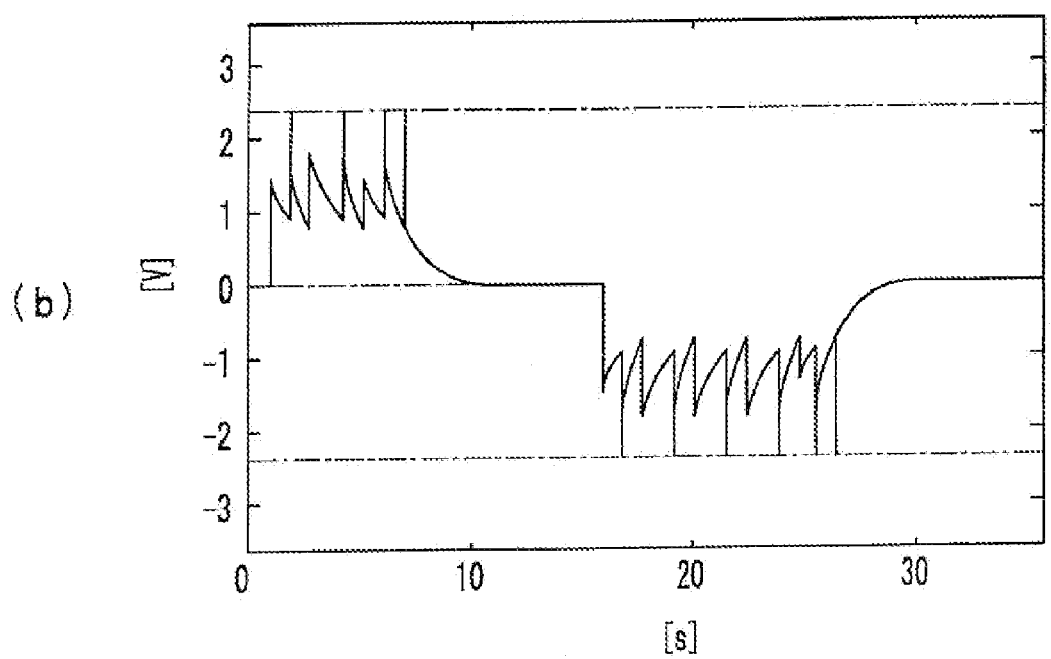

Thereafter, when the rotation angle is moved from +40° to −28°, the provisional target value is also defined as shown in FIG. 5(*a*). Thus, the input voltage input to the DC motor 201 does not exceed 2.4V, as shown in FIG. 5(*b*), and the constraints are not violated.

Figure 6:
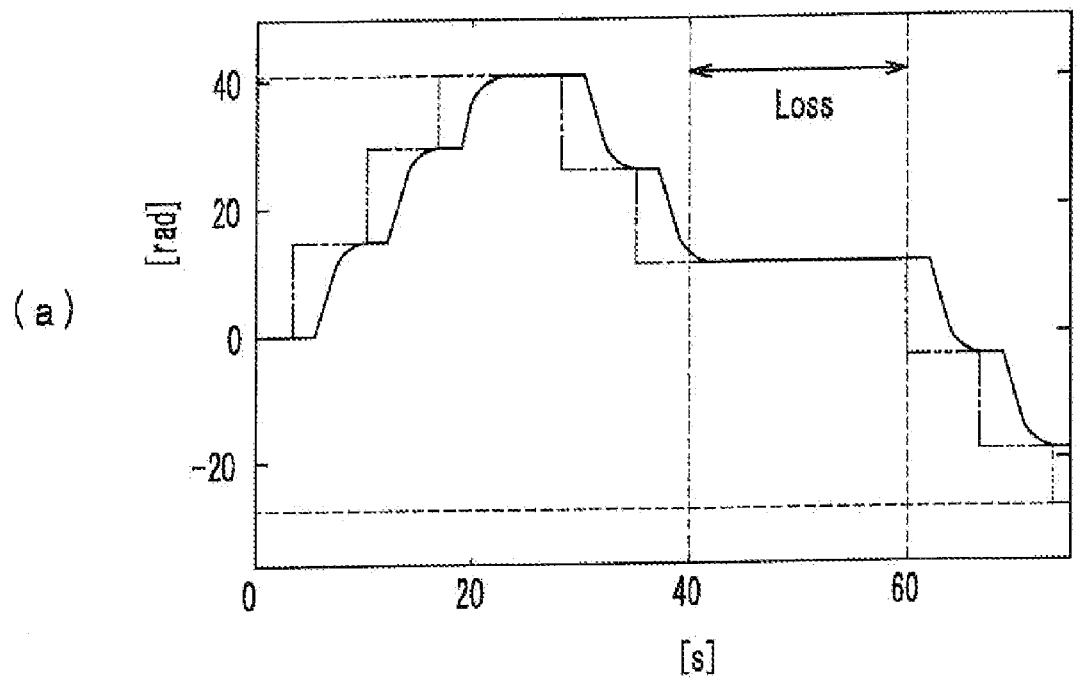
FIGS. 6(a) and 6(b) are graphs illustrating another example of the remote control system according to the embodiment of the present invention, and specifically
Figure 6:
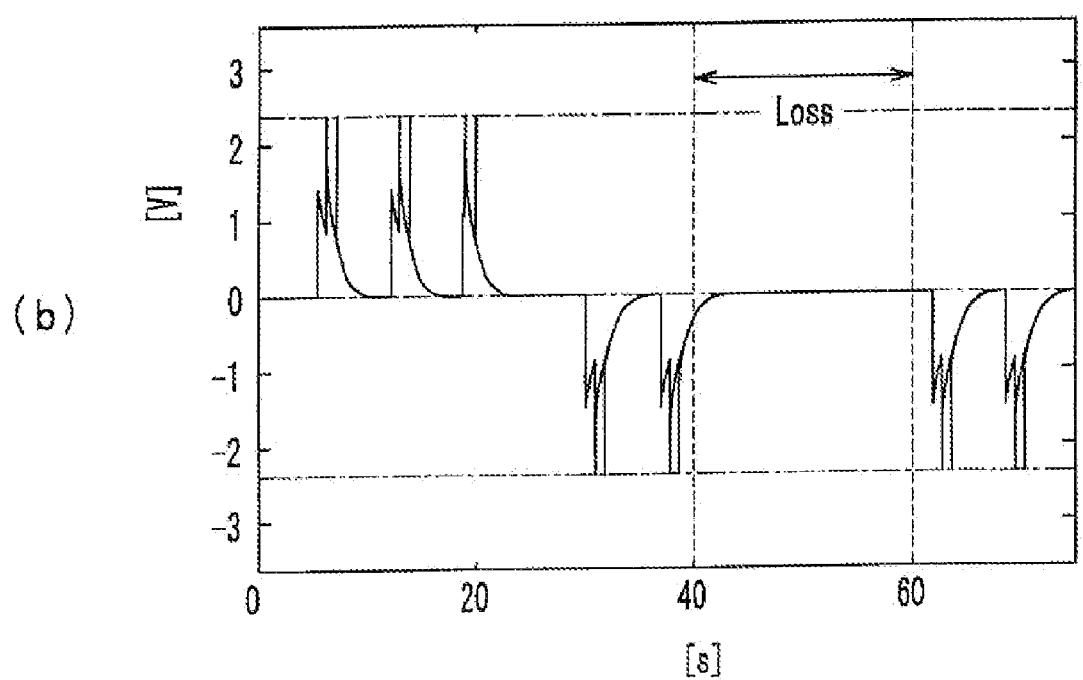

Next, the second example will be described. In this example, the communication from the host-side control unit 103 to the client-side control unit 104 is subject to the two-second delay, the communication from the client-side control unit 104 to the host-side control unit 103 is subject to the three-second delay, and moreover, the middle of the communication from the client-side control unit 104 to the host-side control unit 103 is subject to the 20-second loss. FIG. 6(*a*) illustrates the relationship between time and rotation angle of the load 204 in the second example, and FIG. 6(*b*) illustrates the relationship between time and input voltage.

In this case, when the rotation angle is moved from 0° to +40°, the provisional target value is also determined as indicated by the two-dot chain line in FIG. 6(*a*). Although the communication from the host-side control unit 103 to the client-side control unit 104 is subject to the two-second delay, the rotation angle of the load follows the provisional target value and finally the load rotates +40°. Since the provisional target value is determined, the input voltage input to the DC motor 201 does not exceed 2.4V as shown in FIG. 6(*b*) and thus the constraints are not violated.

Similarly, when the rotation angle is moved from +40° to −28°, the rotation angle of the load follows the provisional target value and finally the load rotates −28°. Also in this case, since the provisional target value is determined, the input voltage input to the DC motor 201 does not exceed 2.4V as shown in FIG. 6(*b*) and thus the constraints are not violated.

In the example, the middle of the communication from the client-side control 104 unit to the host-side control unit 103 breaks up for 20 seconds. During the period, the host-side control unit 103 cannot receive the state evaluation information. When the host-side control unit 103 does not receive the state evaluation information, the state determining unit 407 determines "OUT" and thus the target value updating unit 410 does not update the target value. This is also illustrated in FIG. 6(*a*). During the break of the communication, the target value does not change and the load is controlled to follow the target value at that time.

Figure 7:
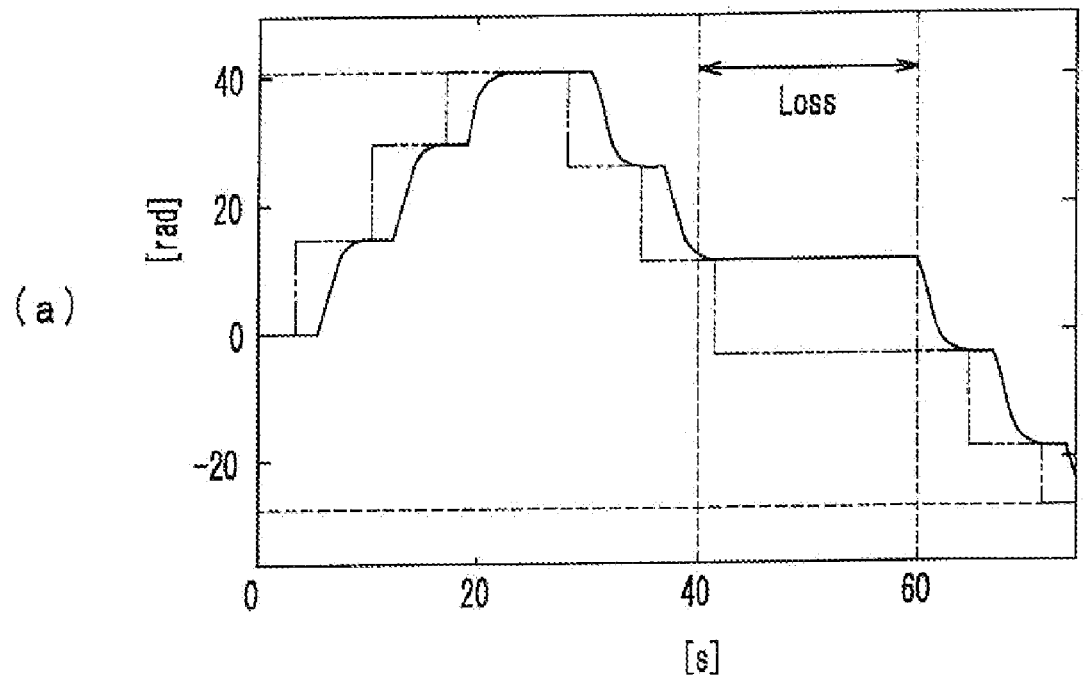
FIGS. 7(a) and 7(b) are graphs illustrating another example of the remote control system according to the embodiment of the present invention, and specifically
Figure 7:
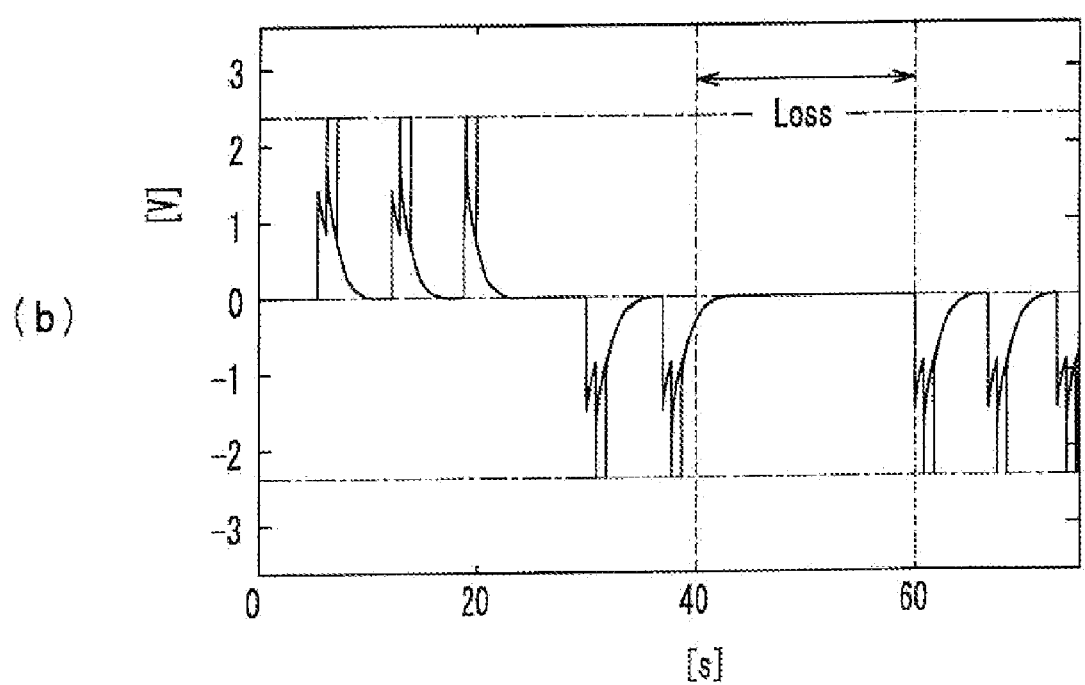

Next, the third example will be described. In this example, the communication from the host-side control unit 103 to the client-side control unit 104 is subject to the two-second delay, the communication from the client-side control unit 104 to the host-side control unit 103 is subject to the three-second delay, and moreover, the middle of the communication from the host-side control unit 103 to the client-side control unit 104 is subject to the 20-second loss. FIG. 7(*a*) illustrates the relationship between time and rotation angle of the load 204 in the third example, and FIG. 7(*b*) illustrates the relationship between time and input voltage.

In this case, when the rotation angle is moved from 0° to +40°, the provisional target value is also determined as shown in FIG. 7(*a*). Although the communication from the host-side control unit 103 to the client-side control unit 104 is subject to the two-second delay, the rotation angle of the load follows the provisional target value and finally the load rotates +40°. Since the provisional target value is determined, the input voltage input to the DC motor 201 does not exceed 2.4V as shown in FIG. 7(*b*) and thus the constraints are not violated.

Similarly, when the rotation angle is moved from +40° to −28°, the rotation angle of the load follows the provisional target value and finally the load rotates −28°. Also in this case, since the provisional target value is determined, the input voltage input to the DC motor 201 does not exceed 2.4V as shown in FIG. 7(*b*) and thus the constraints are not violated.

In the example, the middle of the communication from the host-side control unit 103 to the client-side control unit 104 breaks up for 20 seconds. During the period, the client-side control unit 104 cannot receive the updated target value. When the client-side control unit 104 does not receive the updated target value, the rotation angle of the load is controlled to follow the pre-updated target value. Therefore, the rotation angle of the load 204 will not have changed until the communication is recovered.

To sum up, the remote control system 100 has: the host-side control unit 103 to which operational information on the target object 102 is input; and the client-side control unit 104 which is connected to the host-side control unit 103 via the network 101 and feedback controls the state of the target object 102 towards the target value received from the host-side control unit 103. The client-side control unit 104 has: the area setting unit 306 for setting at least two areas representative of a group of states of target objects 102 each of which changes over time by feedback control within state space representative of the states of the target object 102; and the state-evaluation information sending unit 301 for sending, to the host-side control unit 103, the state evaluation information which is obtained by evaluating the states of target object 102 based on the area set by the area setting unit 306. Moreover, the host-side control unit 103 has: the target value setting unit 408 for setting a target value such that the states of the target object 102 change within the area set by the area setting units 306, 406 based on the input operational information of the target object 102; the target value updating unit 410 for updating the target value based on the state evaluation information received from the client-side control unit 104; and the target value sending unit 401 for sending the target value to the client-side control unit 104.

With the remote control system 100, in the case where the target object 102 in a distant location is remotely controlled via the network 101, even with an environment in which the network 101 has inferior communications and transmission delay or loss of communication data, and an event (distortion)

in which the order of arrival of the communication data is changed occur, the target object 102 can certainly follow the target value while the constraints of the control system are satisfied.

Moreover, in the aforementioned embodiment, each area set by the area setting units 306, 406 is set based on the gain, and the client-side control unit 104 has the switching unit 310 for switching the gain of the feedback control depending on the areas where the state of the target object 102 is located.

With this configuration, the target object 102 can be appropriately controlled depending on the areas set by the area setting units 306, 406. In particular, in the case where there is an environment having inferior communication network 101, even when the transmission delay or loss of the communication data, or the event (distortion) such as the change of the arrival order of the communication data occurs, it is possible to ensure that the target object 102 is stably manipulated.

Moreover, the remote control system 100 according to the aforementioned embodiment, each area set by the area setting unit 306, 406 is defined by the maximum output allowable set of the state feedback system which is determined based on the state the target object 102, the target value, and the gain.

The maximum output allowable set ensures that when the state of the target object 102 at a time is located within the maximum output allowable set with respect to the target value, the constraints are satisfied as long as the target value of the state feedback does not change, and that the state of the target object 102 indefinitely continues to be located within the maximum output allowable set. Moreover, the maximum output allowable set can be determined by the given numerical calculation, and therefore the maximum output allowable set is suitable as means for setting the areas by the area setting units 306, 406.

The remote control system according to one embodiment of the present invention has been described, but the remote control system of the present invention is not limited to the above embodiment.

For example, in the above embodiment, the state-evaluation information sending unit 301 of the client-side control unit 104 sends, to the host-side control unit 103, the state evaluation information on which area of the areas set by the area setting unit 306 the state of the target object 102 is located in. The target value updating unit 410 of the host-side control unit 103 receives the state evaluation information, and when the state of the target object 102 enters the predetermined area, the target value updating unit 410 updates the target value. In other words, the client-side control unit 104 does not determine "OUT" and "IN" and the host-side control unit 103 determines "OUT" and "IN" based on the state evaluation information which is obtained by evaluating which area of the areas set by the area setting unit 306 the state of the target 102 is located in.

However, the remote control system of the present invention is not limited to this configuration. For example, it may be provided that the state-evaluation information sending unit of the client-side control unit 104 sends, to the host-side control unit 103, the information on whether the state of the target object 102 is located within a predetermined area of the areas set by the area setting unit 306, as the state evaluation information, and the target value updating unit 410 of the host-side control unit 103 updates the target value when the state of the target object 102 enters the predetermined area. In other words, the client-side control unit 104 may determine "OUT" and "IN." With this configuration, the information amount of data sent from the client-side control unit 104 to the host-side control unit 103 can be more reduced, and the effect of low-quality network can be further reduced.

Figure 9:
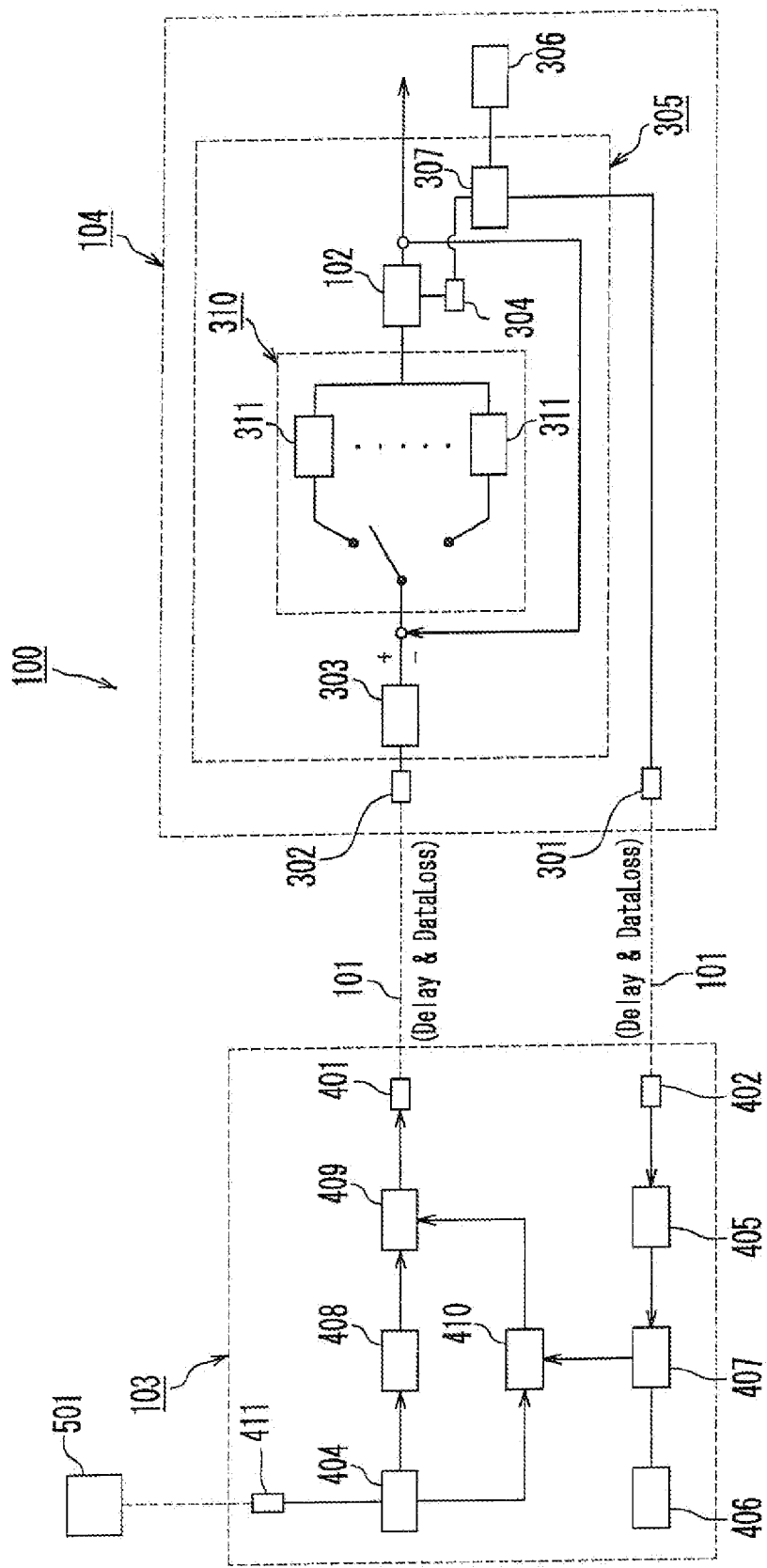
FIG. 9 is a diagram illustrating another example of the remote control system according to the embodiment of the present invention.

Moreover, as shown in FIG. 9, a terminal 501, by which the operational information of the target object 102 is input to the client-side control unit 104, may be provided separate from the client-side control unit 104, and the terminal 501 may be connected to the client-side control unit 104 via the network. Again, if the network between the client-side control unit 104 and the host-side control unit 103 is low quality, the host-side control unit 103 can certainly perform the feedback control.

Such embodiment will be useful, for example, when any operator who inputs the operational information cannot enter the location where the client-side control unit 104 is placed, and the high-quality network cannot be built between the client-side control unit 104 and the host-side control unit 103.

Specifically, for example, when the robot arm of the moonlanding robot is operated via intersatellite communication, the client-side control unit 104 may be mounted on the satellite and the host-side control unit 103 may be mounted on the robot. In this case, even when the communication between the satellite and the moonlanding robot is unstable, it is possible to stably operate the robot arm of the robot.

Furthermore, in the present invention, in comparison of the calculation process needed for the client-side control unit 104 with that needed for the host-side control unit 103, the calculation process of the client-side control unit 104 is larger. Therefore, the client-side control unit 103 requires more advanced arithmetic unit whereas the host-side control unit 103 requires only simpler arithmetic unit, and thereby the lighter arithmetic unit can be used. As a result, the weight of the host-side control unit 103 can be reduced. In the aforementioned application, in order to reduce the weight of the moonlanding robot, the arithmetic unit provided at the robot side may be desired to be simpler. In this case, the client-side control unit 104 is mounted on the satellite and the host-side control unit is mounted on the robot so as to reduce the weight of the arithmetic unit which performs the processing of the host-side control unit 103. This contributes to the reduction of the weight of the moonlanding robot.

Specifically, as a preferable application example of the present invention, the operation of the robot arm of the moonlanding robot via the intersatellite communication has been exemplified. However, only such application does not constitute the application in which any operator who inputs the operational information cannot enter the location where the client-side control unit is placed, and the high-quality network cannot be built between the client-side control unit 104 and the host-side control unit 103. For example, the present invention can be widely applied to the application in which in the control of the robot acting for example in outer space, nuclear reactor, coal complex, deep sea or the like, the host-side control unit 103 is mounted on the actually acting robot, the client-side control unit 104 is placed in the middle of the robot and the operator, and the high-quality network cannot be built between the client-side control unit 104 and the host-side control unit 103, or the like.

The invention claimed is:

1. A remote control system for remotely controlling a target object in a distant location via a network, the remote control system comprising:
   a host-side control unit to which operational information of the target object is input; and
   a client-side control unit which is connected to the host-side control unit via the network and feedback controls the state of the target object towards a target value received from the host-side control unit,
   wherein the client-side control unit includes:
      a target value memory unit to store the target value received from the host-side control unit, the target value memory unit to further store the target value sent by the host-side control unit at a latest time among the target values received by the client-side control unit as the latest target value of the target object;

an area setting unit for setting at least two areas representative of a group of states of the target object each of which changes over time by the feedback control within a state space representative of the state of the target object; and a state-evaluation information sending unit for sending, to the host-side control unit, a state evaluation information which is obtained by evaluating the state of the target object based on the area set by the area setting unit, and the host-side control unit includes:

a target value setting unit for setting the target value such that the state of the target object changes within the area set by the area setting unit based on the input operational information of the target object;

a target value updating unit for updating the target value based on the state evaluation information received from the client-side control unit; and a target value sending unit for sending the target value to the client-side control unit;

wherein the client-side control unit is adapted to detect delay, loss and distortion of data based on a sending time at which the host-side control unit sends the target value and a receiving time at which the client-side control unit receives the target value, and wherein, when data loss through delay, loss and distortion is detected, the target value stored in the target memory unit does not change.

2. The remote control system of claim 1, wherein each area set by the area setting unit is set based on a gain, and the client-side control unit has a switching unit for switching the gain of the feedback control depending on areas where the state of the target object is located.

3. The remote control system of claim 2, wherein each area set by the area setting unit is defined by maximum output allowable set of a state feedback system which is determined by the state of the target object, the target value, and the gain.

4. The remote control system of claim 1, that wherein the state-evaluation information sending unit of the client-side control unit sends, to the host-side control unit, the state evaluation information on which area of the areas set by the area setting unit the state of the target object is located in, and the target value updating unit of the host-side control unit updates the target value when the state of the target object enters a predetermined area upon receipt of the state evaluation information.

5. The remote control system of claim 1, that wherein the state-evaluation information sending unit of the client-side control unit sends, as the state evaluation information to the host-side control unit, information on whether or not the state of the target object is located in one of predetermined areas set by the area setting unit, and the target value updating unit of the host-side control unit updates the target value when the state of the target object enters one of the predetermined areas.

6. The remote control system of claim 1, wherein the target object is a linear system.

7. The remote control system of claim 1, wherein the target object is a nonlinear system capable of linear approximation.

8. The remote control system of claim 1, wherein the target object is in a nuclear reactor.

* * * * *